Oct. 7, 1969　　　　　　　E. M. PROSEN　　　　　3,470,935
PROSTHETIC DENTISTRY
Filed Sept. 13, 1965　　　　　　　　　　　2 Sheets-Sheet 1
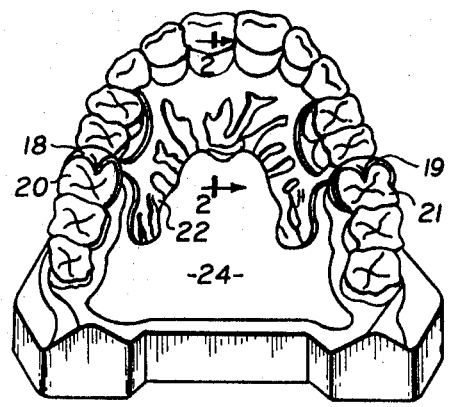
FIG. 1.
FIG. 2.
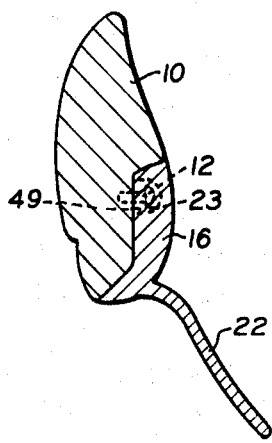
FIG. 3.
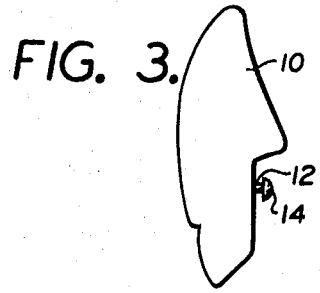
FIG. 4.
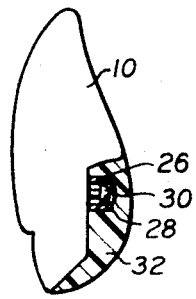
FIG. 5.　FIG. 6.
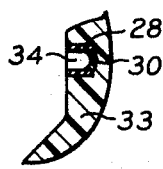 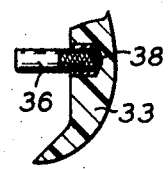
FIG. 7.
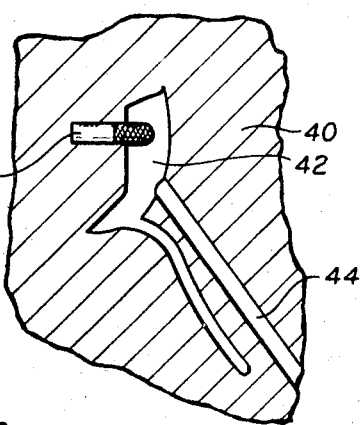
FIG. 8.　FIG. 9.
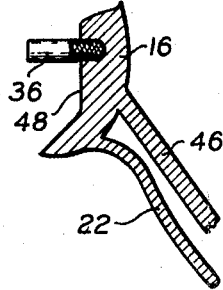 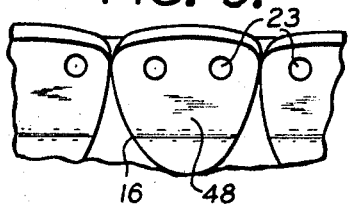
INVENTOR
EMIL M. PROSEN
BY
Byerly, Townsend, Watson
& Churchill
ATTORNEYS.

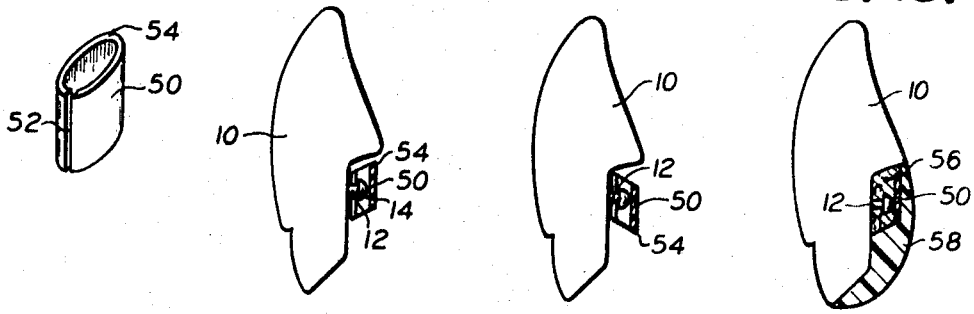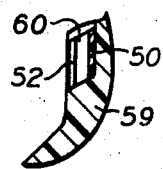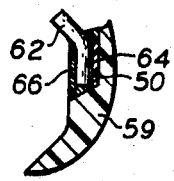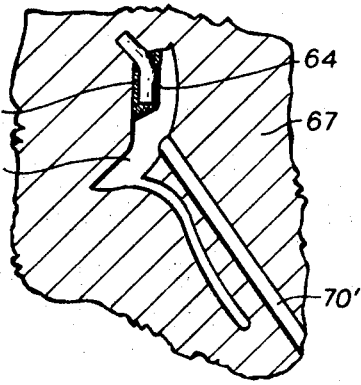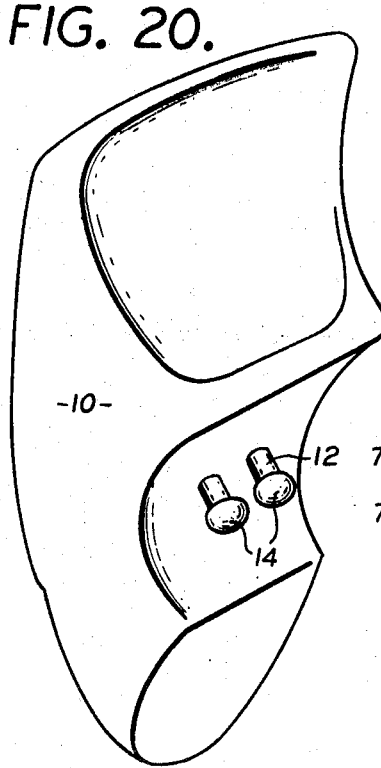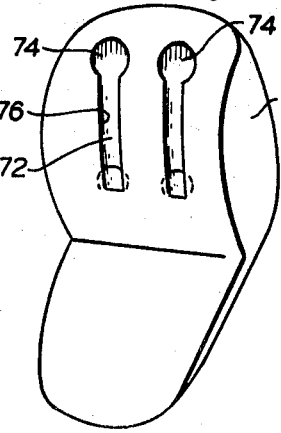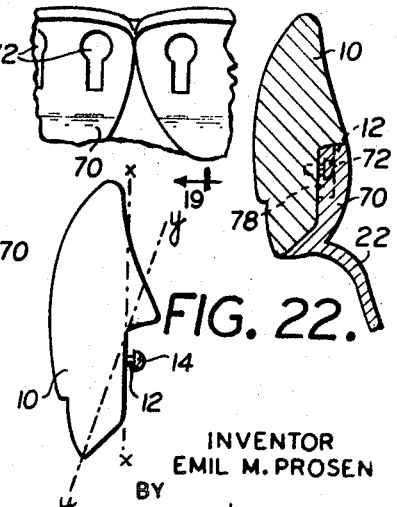

United States Patent Office 3,470,935
Patented Oct. 7, 1969

3,470,935
PROSTHETIC DENTISTRY
Emil M. Prosen, Bala-Cynwyd, Pa., assignor to Nobilium Products, Inc., Philadelphia, Pa., a corporation of Pennsylvania
Continuation-in-part of application Ser. No. 360,274, Apr. 16, 1964. This application Sept. 13, 1965, Ser. No. 486,901
Int. Cl. B22c 9/02; A61c 13/00, 13/08
U.S. Cl. 164—34     12 Claims

ABSTRACT OF THE DISCLOSURE

The method of making a dental restoration having one or more porcelain teeth each provided with headed pins by forming in a metal support for such teeth, sockets for definitely locating and accommodating said pins by horizontal, lingual or gingival insertion and locking said denture teeth in place in said sockets with a bonding agent.

---

The present invention relates to prosthetic denistry, and is a continuation-in-part of my application, Ser. No. 360,274, now abandoned, filed Apr. 16, 1964. More particularly the invention relates to a novel dental restoration and to the method of forming such restoration comprising a cast metal support and one or more porcelain denture teeth having pins for retentive purposes in such metal support.

Porcelain teeth as used currently in partial restorations are attached by either thermo-plastic or thermo-setting materials which in turn may be anchored in a metal cast support. The denture teeth when mounted in plastic in accordance with prior practice quite often break away from their position, especially when they stand individually in a partial restoration, due to the weakness of the plastic material. In order to provide additional strength it is common practice to provide extra thickness of plastic material which results in bulkiness on the restoration and interferes with tongue movement. Furthermore, such restorations lack quality because plastic material scratches readily under mastication of food, they develop stains and food particles adhere thereto, thus making it difficult to keep the restoration clean.

The objects of the present invention are to provide novel dental restorations and to a method of mounting one or more porcelain denture teeth having pins directly in cast metal supports whereby there will be provided a more natural shape control, greater stability, cleanliness, strength, lifelike beauty, ease of replacement in case of breakage and enhancement of the esthetic appearance of the dental restoration as a whole.

The foregoing objects I accomplish by utilizing the pin or pins on porcelain denture teeth for definitely locating and forming in the cast metal support for such teeth, sockets for accommodating said pins by horizontal, lingual or gingival insertion and for locking such denture teeth in place with a bonding agent. The invention will be better understood from the detailed description which follows when considered in connection with the accompanying drawings which illustrate preferred methods of carrying out the invention wherein, FIG. 1 is a perspective view of a maxilla dental model having mounted thereon a partial restoration typifying an application of my invention to a cast metal dental appliance;

FIG. 2 is a section taken along the line 2—2 on FIG. 1 and showing the relation of a denture tooth to its mounting means;

FIG. 3 is a side elevation of the porcelain denture tooth shown in FIG. 2 prior to mounting on the cast metal support;

FIGS. 4–7 show transverse sections of successive steps in the method of preparing the prosthetic dental restoration;

FIG. 8 is a transverse section of the cast metal support structure as it appears when removed from the casting mold;

FIG. 9 is a fractional front elevation of the support structure prior to mounting the denture teeth thereon as shown in FIGS. 1 and 2;

FIG. 10 is a perspective view of a slotted sleeve for use in the embodiments of my invention shown in FIGS. 11 to 21;

FIGS. 11–16 show transverse sections of successive steps in the method of preparing the prosthetic dental restoration shown in FIGS. 18 to 20;

FIG. 17 is a transverse section of the cast metal support structure as it appears when removed from the casting mold shown in FIG. 16;

FIG. 18 is a fractional front elevation of the cast metal support structure prior to mounting the porcelain denture teeth thereon;

FIG. 19 is a section taken along the line 19—19 of FIG. 18 and showing the relation of a denture tooth when mounted on the cast metal supporting structure;

FIGS. 20 and 21 are enlarged perspective views of a porcelain denture tooth and the complemental portion of the cast metal supporting structure for said tooth;

FIG. 22 is a side elevation of a porcelain denture tooth showing how the lingual face thereof may be modified to facilitate mounting of such tooth under certain conditions.

Referring first to FIGS. 1 to 9 of the drawings, the embodiment of the invention therein shown may be said to consist in starting with the number and character of porcelain denture teeth, to be mounted on the all metal support to be cast for a partial restoration, said teeth being shown as anterior teeth 10, each provided with a pair of anchoring or holding pins 12 having enlarged mushroom-shaped heads 14. These pins serve to permanently mount the denture teeth 10 on a cast metal support structure 16 herein shown as formed at its opposite ends with clasps 18 and 19 for engagement over first left and right molars 20 and 21, respectively. In FIG. 1 the maxilla dental model of a person's mouth shows a rugae horseshoe 22 including the structure 16 as an integral part thereof covering partially the palatal area 24.

According to the present invention, instead of mounting the porcelain teeth having retention pins in a thermo-plastic or thermo-setting resin, they are mounted directly on the cast metal support structure with the pins 12 on said teeth locked in sockets 23 which are formed in the face of said cast metal support in complementary relation to the pins. The procedural steps in accomplishing this will now be described with reference to a single porcelain denture tooth for mounting on the metal support structure although it will be understood that the same procedural steps will be followed in mounting more than one tooth.

Referring to FIG. 4 of the drawings, the projecting headed pins 12 are each first enclosed within a heat disposable cap 26, which is herein shown as formed by a thermo-plastic cylinder or tube 28 snugly fitted over the head of the pin and of a length to protect said head. The open end of the tube is then closed with wax or plastic 30 to completely enclose the pin. In this connection, it is preferable to use plastic tubes and a sealant closure for the tubes rather than integral caps since there is a variance in the length of the pins on denture teeth as obtainable from the manufacturers thereof. The caps, when placed in position, enclose the undercut or shank portions of the pins provided by the enlarged heads. The capped pins are then enclosed within a heat disposable thermoplastic backing material 32 which will bond to the cap 26 but not to the surface of the tooth 10. The backing material may be a flowable mix of a self-curing acrylic which can be applied with a pointed spatula, by gradually adding small drops of the backing mix, making sure that the mix flows into the narrow spaces around the tube and forms definite contact with the porcelain of the denture tooth and said mix is progressively added until the lingual side of the tooth is properly covered. After the acrylic has cured, the excess is trimmed away and any remaining surplus thereof should be removed by a rubber wheel or the like to give desired contour to the resulting backing 33. The hardened acrylic backing 33 with the caps bonded therein as a unit is then pried away from the tooth and any wax used to close the top of the tube 28 and which may have found its way into the tube is then removed, leaving the backing structure with sockets 34 therein as best shown in FIG. 5.

The backings 33, where a plurality of them have been prepared for the various denture teeth to be incorporated in the prosthetic restoration are then replaced on the teeth and the teeth with the backings are placed on the matrix and the matrix, in turn, is positioned on the model. A flowing mix of backing material is used to join the individual teeth by flowing the mix into interproximal spaces and allowing it to harden. The pattern thus formed is trimmed as accurately as possible to avoid unnecessary grinding away of metal when cast. After the case is waxed and sprued, the teeth are removed therefrom and pin-like members 36, selected according to the size of the sleeves 28 used, are inserted in the sockets 34.

In FIG. 6 I have shown a pin-like member 36 formed of high melting point material such as nickel, stainless base alloy or refractory fixed in position within a socket 34 in the backing 33 with a substantial portion of the pin extending outwardly from said socket. Where the cast metal denture support structure 16 is to be formed of stainless base metal, the pin is preferably formed of nickel and the inserted end 38 thereof is preferably knurled or serrated, whereas when the support structure is to be formed of gold a smooth stainless base metal pin may be used which has been first dipped in a thin mix or slurry of investment material. The pinned, waxed and sprued case is then invested in refractory material after which the heat disposable members consisting of the backings 33 with their enclosed caps 26 and the wax model of the support structure 16 and rugae horseshoe are then melted out of the refractory investment to leave a refractory mold 40 which supports the pins 36, the inner ends of which project into a resulting mold space 42 formed with a sprue opening 44 as shown in FIG. 7. Molten denture casting metal is then cast within the mold space through the sprue opening 44 and after the casting has cooled, the mold is broken open and the casting consisting of the support structure 16 for the denture teeth together with the pins 36, the rugae horseshoe 22 and the metal sprue 46 as shown in FIG. 8 is obtained.

The sprue 46 is then cut off and the casting sandblasted. The pins are then removed from the casting. Where the casting is formed of stainless base metal, the exposed portion of the nickel pins may be first cut off and the casting is placed in a 50% solution of nitric acid and boiled until the pins are dissolved. Where the casting is gold, the stainless steel pins may be removed by force with pliers. The removal of the pins leaves sockets 23 in the face 48 of the support structure 16. Where the pins 36 are dissolved away, the walls of the resulting sockets 23 will have a knurled or serrated surface, depending upon the surface contour at the inner ends of said pins and will provide a better locking surface for cement 49 which engages around the pins 12 on the porcelain denture teeth. After the pins 36 are removed, the casting is finished and polished and is ready to receive the denture teeth 10 which are then cemented to the face 48 of the metal support structure 16 and locked around the pins 12 engaging in the sockets 23 by a coating of a suitable cement 49.

In the procedure hereinbefore set forth, it was sought to provide a cast metal support with sockets formed therein which would receive as closely as possible the tooth pins so that the cement engaged in the close fit of the socket around the head of the pin would provide sufficient retention of the tooth. However, occasionally, the desired closeness of the fit of the socket in the cast metal support with respect to the head of the pin was not realized and hence dependence on the cement for retention of the tooth was not always as strong as desired. To overcome this uncertainty, I now provide a mechanical locking of the pin within the socket by forming in the face of the cast metal support a modified T-shaped socket adapted to slidably receive through one end thereof the headed pin projecting from the lingual face of the porcelain tooth so that the head of the pin cannot pass through the upright slot of the T which is of a width to only accommodate the shank of the headed pin. In order to provide for the sliding of the headed pin into the T-shaped socket in the cast metal support, the pin must be inserted from either a gingival or an incisal approach and such choice has to be made before proceeding with the fabrication of the metal support.

In FIGS. 10–21, I have illustrated the procedural steps to be followed with reference to mounting a single porcelain tooth on a cast metal supporting structure from an incisal and from a gingival approach. It will be understood, however, that the same procedural steps will be followed in the mounting more than one tooth.

Referring now to FIGS. 10–13 of the drawings, the headed pins 12, only one of which is shown, is each enclosed within a preformed cylindrical slotted sleeve 50 having a slightly larger internal diameter than the head 14 on the pin and a slot 52 extending parallel to the axis of the sleeve and being of a width to accommodate the shank of the pin. The sleeve has at least one end extending obliquely to the axis of the sleeve at an angle of between 100°–135° to the axis of the sleeve with the overhang 54 at said oblique end diametrically opposite to the slot 52. The sleeve is mounted over the pin with the slot in confronting engaging relation to the lingual face of the tooth with the overhang 54 extending the direction toward the incisal or biting end of the tooth as shown in FIG. 11, or toward the gingival end of the tooth as shown in FIG. 11, or toward the gingival end of the tooth as shown in FIG. 12. The slotted sleeve 50 is preferably formed of a thermo-plastic resin such as nylon, although within the broad concept of the invention the slotted sleeve may be formed of a heat refractory metal as will be explained hereinafter.

In FIGS. 11 and 13–18, the procedure to be followed is limited to forming a restoration where the tooth or teeth are to be mounted on the cast metal supporting member from an incisal approach. Accordingly, the slotted sleeve 50 positioned over the pin 12 as shown in FIG. 11, then has its bore and slot filled completely with a melted soft wax 56 through the overhang end of the sleeve, care being taken to keep the outside surface of the sleeve free from wax. The wax-filled sleeve is then encased in a viscous, self-hardening thermoplastic backing composition 58 which will bond to the sleeve but not to the surface of the tooth. If desired, or found necessary, the exterior of the sleeve may be serrated to promote adhesion of the backing composition thereto. The backing composition may be a flowable mix of self-curing acrylic which should be applied with a pointed spatula by gradually adding small drops of the backing composition, making sure that the mix flows into the narrow spaces around the sleeve and forms definite contact with the lingual face of the porcelain tooth and said mix is progressively added until the said face of the tooth is properly covered. After the backing composition has hardened, any excess thereof is trimmed away to provide the proper shape for the backing which will eventually determine the shape of the cast metal tooth supporting member of the dental restoration. The backing, with the slotted sleeve adhering thereto, is then removed as a unit 5 from the tooth by moving the backing unit in a direction away from the sleeve overhang so that the pin may pass through the soft wax filling and out through the overhang end of the sleeve. The wax remaining in the backing is then boiled off leaving the backing unit with a socket 60 therein containing the sleeve as shown in FIG. 14.

The backing unit 59 consisting of the hardened backing composition and the split sleeve contained therein, or where a plurality of such backing units have been prepared for the various denture teeth to be incorporated in the prosthetic restoration, are then replaced on the teeth and teeth with the backing units are placed on the matrix, and the matrix, in turn, is positioned on the model. A flowing mix of backing material is then used to join the individual teeth by flowing the mix into interproximal spaces and allowed to harden. The pattern thus formed is trimmed as accurately as possible to avoid unnecessary grinding away of metal when cast. After the case is waxed and sprued, the teeth are removed therefrom and one leg of an angular or bent pin-like member 62 selected according to the size of the sleeves 50 used, is inserted in each socket 60.

In FIG. 15 I have shown a pin-like member 62 formed of a high melting point material such as nickel, stainless base alloy or refractory fixed in position within a socket 60 in the backing unit 59 with a substantial portion or other leg of the pin extending outwardly from the socket at an obtuse angle to the axis of the socket. Bent pins are used in this type of construction to provide an angularly disposed end opening in the socket to be formed in metal casting to admit entry of the pin into the socket, i.e., the head of the pin into the bore of the socket and the shank of the pin into the slot in the socket. Where the cast metal denture support structure is to be formed of stainless base metal, the pin is preferably formed of nickel and where the support structure is to be formed of gold, a stainless base metal pin may be used. In either case it is preferable to first fill the socket 60 with a thin mix or slurry of investment material or dip the inserted end of the pin in such mix to provide a refractory coating 64 on the pin and fill the slot in the sleeve with investment material 66. The pinned, waxed and sprued case is then invested in refractory material after which the heat-disposable members consisting of the backing unit 58 and the waxed model of the support structure are then melted out of refractory investment to provide a refractory mold 67 which supports the pins 62, the inner ends of which project into a resulting mold space 68 formed with a sprue opening 70 as shown in FIG. 16. Molten denture casting material is then cast within the mold space through the sprue opening 70 and after the casting has cooled, the mold is broken open and the casting consisting of the support structure 70 for the denture teeth, together with the pins 62, the rugae horseshoe 22 and the metal sprue 71 as shown in FIG. 17 is obtained.

The sprue 71 is then cut off, the pins 62 removed and the casting sand-blasted to remove the investment material 64 and 66 which has coated the pin and filled the slot in the slotted sleeve 50. The removal of the bent pins 62 leaves substantially T-shaped sockets 72 in the face of the cast metal support structure 70 with the bore 74 of said sockets of a size to accommodate the head 14 of the pin 12 and the slot 76 of a width smaller than the bore 74 but sufficient to accommodate the shank of the pin 12. After the bent pins 62 have been removed, the casting is finished and polished and is ready to receive the denture tooth 10 from an incisal approach by inserting the headed pins 12 on said tooth into the sockets 72 through the open ends thereof and sliding the shank of said pins in the slots of said sockets into retention position of the tooth, the said sockets being first filled with a cementing medium 78 which will provide a stabilizing effect to retain the tooth in its definite retention position since the head of the pin cannot pass through the slot.

Where a tooth or teeth are to be applied to the cast metal support from a gingival approach, the same procedure outlined above is followed after mounting the split sleeve 50 over the headed pin 12 as shown in FIG. 12. As the outwardly projecting portion of the bent or angled pin 62 will then upon insertion of said pin extend toward the gingival end of the tooth, the resulting casting will have the open ends of the sockets for insertion of the tooth pins in proximity to the gingival edge of the cast metal supporting structure.

Under certain formations of a patient's jaw, to obtain definite locking of the pins 12 on the denture tooth to be used in partial or fixed bridge construction, it is necessary to prepare the tooth by grinding away part of the lingual surfaces which would interfere with the insertion of the pins when mounting the tooth in the cast metal support. In FIG. 22, I have indicated by a broken line x—x the amount of lingual surface of the tooth which it may be necessary to grind away for incisal insertion of the tooth and by a broken line y—y the portions of the lingual surface of the tooth that it may be necessary to grind away for gingival insertion of the tooth. Before grinding away the portions of the tooth indicated by the lines x—x and y—y, it will be necessary to place protective cylinders (not shown) around the headed pins to avoid damaging such pins during the grinding operation. After the grinding is completed, the protective cylinders are removed and the procedure followed with respect to incisal and gingival approach for the mounting of the tooth as hereinbefore described in detail.

Once a casting has ben made to receive a particular tooth, the same casting will be capable of receiving a replacement tooth that was made in the same mold as said particular tooth. The casting is flexible enough to allow for slight variations due to shrinkage of teeth made in the same mold.

In lieu of using a heat-disposable, slotted sleeve in preparing the cast metal supporting member of the restoration, it is posible to use instead of the heat-disposable, slotted sleeve, a sleeve formed of a high melting point alloy which will bond to and form an integral part of the casting of the dental restoration.

From the foregoing detailed description it will be apparent that I have set forth novel methods of accomplishing the objects of the invention as set forth in the opening statement of this specification and although I have shown and described the preferred methods of doing so, it is to be understood that the specific shape and arrangement of the porcelain denture teeth and the pin or pins thereon may be varied without departing from the spirit of the invention as hereinafter claimed.

What I claim is:

1. The method of making a dental restoration comprising a cast metal support and a porcelain denture tooth provided with a headed anchoring pin, said method comprising the following steps:

(a) enclosing said pin within a preformed sleeve of slightly larger internal diameter than the head of the pin;

(b) encasing said sleeve at the lingual face of said tooth in a viscous, self-hardening, thermo-plastic backing composition which will bond to said sleeve;

(c) removing from the tooth the backing composition after it has hardened together with the sleeve as a unit;

(d) replacing said backing unit on said tooth and preparing therewith a wax-up of the dental restoration;

(e) removing the tooth from the wax-up;

(f) mounting within the sleeve retained in the backing unit a heat-refractory, pin-like member having a portion substantially filling the bore of the sleeve and having a portion extending beyond the face of the backing unit which is complemental to the lingual face of the tooth;
(g) investing the pin-containing wax-up in refractory material;
(h) providing a mold space in said refractory material by melting out the wax and the heat-disposable members;
(i) casting suitable metal in the mold space thus provided;
(j) removing the pin-like member from the casting to provide therein a socket for the reception of the anchoring pin on the denture tooth;
(k) finishing the denture casting and then with the aid of a bonding agent mounting said tooth on said casting with the anchoring pin engaging in said socket provided by the removal of the pin.

2. The method according to claim 1, wherein between steps (e) and (f) a coating of ceramic material is applied to the portion of the pin member which is inserted into the bore of the sleeve and wherein between steps (j) and (k) the ceramic material which surrounded the pin is removed.

3. The method according to claim 1, wherein the self-hardening backing composition is a thermo-plastic resin.

4. The method according to claim 1, wherein the portion of the pin-like member which is mounted in the bore of the sleeve which is retained in the backing unit is roughened.

5. The method according to claim 1, wherein the pin-like member is a metal pin and wherein said metal pin is removed from the metal casting by a solvent.

6. The method according to claim 1, wherein the preformed sleeve is closed at one end and is of a length substantially equal to the exposed portion of the headed anchoring pin.

7. The method according to claim 1, wherein the porcelain denture tooth has a plurality of pins and each of the pins is enclosed in a sleeve and a pin-like member is inserted in each retained in the backing unit.

8. The method of making a dental restoration comprising a cast metal support and a porcelain denture tooth provided with a headed anchoring pin, said method comprising the following steps:
(a) enclosing said pin within a preformed slotted sleeve, the bore of which is slightly larger than the head of the pin with the slot of which extends parallel to the axis of the sleeve and is of a width to accommodate the shank of the pin but smaller than the head of the pin, at least one end of the sleeve extending obliquely to the axis of the sleeve with the overhang at said oblique end diametrically opposite to the slot, said sleeve being mounted over the pin with the slot in confronting relation to the lingual face of the tooth and with the overhang of the sleeve extending in a direction toward or away from the biting edge of the tooth depending upon whether said tooth is to be mounted on the cast metal support from an incisal or from a gingival approach;
(b) filling the bore and slot in the sleeve with a soft wax;
(c) encasing said sleeve at the lingual face of said tooth in a viscous, self-hardening, heat-disposable backing composition which will bond to said sleeve;
(d) removing from the tooth the backing composition after it has hardened together with the sleeve as a unit, by moving the tooth relatively to the hardened backing composition in a direction away from the sleeve overhang;
(e) removing the wax from the sleeve retained in the backing unit;
(f) replacing said backing unit on said tooth and preparing therewith a wax-up of the dental restoration;
(g) removing the tooth from the wax-up;
(h) mounting within the slotted sleeve retained in the backing an angularly bent pin one leg of which fills the bore of the slotted sleeve and the other leg of which extends beyond the face of the backing which is complemental to the lingual face of the tooth;
(i) investing the pin-containing, wax-up in refractory material;
(j) providing a mold space in said refractory material by melting away the wax and the heat-disposable backing;
(k) casting suitable metal in the mold space thus provided;
(l) removing the pin-like member from the casting to provide therein a socket which is substantially T-shaped in transverse cross section for the reception of the anchoring pin on the denture tooth;
(m) finishing the denture casting and then with the aid of a bonding agent mounting the tooth on said casting with the anchoring pin engaging in said socket provided by the removal of the pin.

9. The method according to claim 8, wherein the slotted sleeve is formed of thermo-plastic material which is melted away in step (j).

10. The method according to claim 8, wherein the slotted sleeve is formed of a high melting metal.

11. The method according to claim 8, wherein between steps (g) and (h) a slurry of ceramic material is applied to the bore and slot in the sleeve before the one leg of the bent pin is inserted into said bore and wherein between steps (l) and (m) the ceramic material which surrounded said leg of the pin and filled the slot in the casting is removed.

12. The method according to claim 8, wherein prior to step (a) a portion of the lingual face of the porcelain tooth is ground away so as not to interfere with the insertion of the headed pins thereon into the slots in the face of the cast metal support which is complemental to the lingual face of the pinned porcelain tooth.

References Cited
UNITED STATES PATENTS 3,315,358  4/1967  Brecht _____ 164—91 X J. SPENCER OVERHOLSER, Primary Examiner V. RISING, Assistant Examiner U.S. Cl. X.R.

32—9; 164—236, 246; 249—54; 264—19

UNITED STATES PATENT OFFICE
CERTIFICATE OF CORRECTION

Patent No. 3,470,935                    Dated   October 7, 1969

Inventor(s)            EMIL M. PROSEN

It is certified that error appears in the above-identified patent and that said Letters Patent are hereby corrected as shown below:

Column 4, line 46, after the comma delete "or toward the gingival end of the tooth as shown"; line 47, delete "in FIG. 11,"

Column 7, line 40, after the word "each" insert -- sleeve --

SIGNED AND
SEALED
SEP 1 - 1970

(SEAL)
Attest:

Edward M. Fletcher, Jr.
Attesting Officer

WILLIAM E. SCHUYLER, JR.
Commissioner of Patents